(12) United States Patent
Schwer et al.

(10) Patent No.: US 8,610,329 B2
(45) Date of Patent: Dec. 17, 2013

(54) DRIVE UNIT FOR A HAIR CUTTING MACHINE

(75) Inventors: Heinrich Schwer, Schonach (DE); Stefan Müller, Aldingen (DE); Gerhard Kienzler, Triberg (DE)

(73) Assignee: Wahl GmbH, Unterkirnach (DE)

( * ) Notice: Subject to any disclaimer, the term of this patent is extended or adjusted under 35 U.S.C. 154(b) by 527 days.

(21) Appl. No.: 12/735,095

(22) PCT Filed: Dec. 12, 2008

(86) PCT No.: PCT/EP2008/010614
§ 371 (c)(1),
(2), (4) Date: Jun. 15, 2010

(87) PCT Pub. No.: WO2009/083117
PCT Pub. Date: Jul. 9, 2009

(65) Prior Publication Data
US 2010/0307009 A1 Dec. 9, 2010

(30) Foreign Application Priority Data
Jan. 2, 2008 (DE) .......................... 10 2008 003 135

(51) Int. Cl.
*H02K 33/06* (2006.01)
*B26B 19/00* (2006.01)

(52) U.S. Cl.
USPC .......................... 310/216.022; 30/208; 30/210

(58) Field of Classification Search
USPC ........................ 310/17, 29–30, 36–38, 45–48, 310/216.021–216.024; 30/43.91, 43.92, 30/208–210
See application file for complete search history.

(56) References Cited

U.S. PATENT DOCUMENTS

| 2,883,590 | A | * | 4/1959 | Axman | 335/243 |
| 3,493,793 | A | * | 2/1970 | Niemela | 310/29 |
| 3,812,389 | A | * | 5/1974 | Bowerman | 310/29 |
| 4,494,101 | A | * | 1/1985 | Buchschmid et al. | 336/210 |
| 4,746,825 | A | * | 5/1988 | Phelon | 310/70 R |
| 5,787,587 | A | * | 8/1998 | Wahl et al. | 30/210 |
| 7,009,322 | B2 | * | 3/2006 | Niimi et al. | 310/216.044 |
| 7,304,407 | B2 | * | 12/2007 | Sanematsu et al. | 310/36 |
| 7,408,280 | B2 | * | 8/2008 | Ooiwa | 310/156.56 |
| 2004/0201304 | A1 | * | 10/2004 | Niimi et al. | 310/216 |
| 2006/0145798 | A1 | | 7/2006 | Kawamoto et al. | |
| 2008/0315710 | A1 | * | 12/2008 | Morioka et al. | 310/217 |

FOREIGN PATENT DOCUMENTS

| CN | 1324289 A | 11/2001 |
| EP | 0 802 614 A1 | 10/1997 |
| JP | 09019123 A | 1/1997 |
| JP | 9019123 A | 1/1997 |
| JP | 2002-177665 | 6/2002 |
| WO | WO 00/27599 | 5/2000 |

* cited by examiner

*Primary Examiner* — Tran Nguyen
(74) *Attorney, Agent, or Firm* — Muirhead and Saturnelli, LLC

(57) ABSTRACT

A drive unit for a hair cutting machine comprises a driving motor that includes a substantially U-shaped stator which has a first leg, a second leg, and at least one additional leg located between the first leg and the second leg, at least one field coil which can be disposed on the at least one additional leg, and an armature. Lateral air gap sections are formed between the first and second leg and the armature while central air gap sections are formed between the additional leg and the armature. The central air gap sections and the lateral air gap sections extend at an angle from a longitudinal axis. A first nose, which faces away from the additional leg, is arranged at the end of the first leg, while a notch, which faces the additional leg and corresponds to the first nose, is arranged on the second leg.

14 Claims, 3 Drawing Sheets

DRIVE UNIT FOR A HAIR CUTTING MACHINE

TECHNICAL FIELD

This application relates to a drive unit for a hair cutting machine.

BACKGROUND OF THE INVENTION

Such drive units are fundamentally known and include a stator, an exciter coil and an armature. The stator and the armature are stamp-packed from individual insulated sheet metal layers to prevent eddy currents. The stator is designed to be essentially U-shaped and has a first leg and a second leg, an additional leg being provided between the first leg and the second leg. The exciter coil is designed as a coil for an electromagnet and is usually positioned on the at least one additional leg. The armature is situated across the legs of the stator, lateral air gap sections being provided between the first leg and the armature and between the second leg and the armature, and central air gap sections being provided between the additional leg and the armature. The central air gap sections and the lateral air gap sections run at an inclination relative to a longitudinal axis of the additional leg.

Such a drive unit is known from WO 00/27599 by the present applicant, for example.

One disadvantage with this design is that optimal mechanical performance of the drive unit is not achieved. Another disadvantage is that with such a configuration, the copper consumption for the exciter coil and the stamping waste of the dynamo sheet metal, of which the stator and armature are packed, are relatively high.

Accordingly, it would be desirable to improve upon a known drive unit for a hair cutting machine of the type defined in the introduction so that it will no longer have the disadvantages described. In particular the mechanical performance of the machine is to be improved, while at the same time the copper consumption and the waste of dynamo sheet metal are to be reduced.

SUMMARY OF THE INVENTION

A drive unit according to an embodiment of the system described herein for a hair cutting machine has a drive motor made of an essentially U-shaped stator having a first leg and a second leg and at least one additional leg situated between the first leg and the second leg. The drive motor additionally has at least one exciter coil, which may be situated on the at least one additional leg. An armature is provided across the legs of the stator, lateral air gap sections being formed between the first leg and the armature and between the second leg and the armature, and central air gap sections being formed between the additional leg and the armature, these sections extending at an inclination with respect to a longitudinal axis of the additional leg. An enlargement of a first lateral air gap section between the first leg and the armature is achieved by a first nose, which is situated on the end of the first end pointing away from the additional leg. A notch provided on the second leg pointing to the additional leg and corresponding to the nose achieves the effect that a second air gap section between the first leg and the armature is not reduced in size and nevertheless a space-saving configuration is possible in the stamped blank. Both the stator and the armature are stacked from individual insulated stamped plates, the individual layers being riveted, for example.

In a refinement of the system described herein, a second nose is provided on the end of the second leg pointing toward the additional leg. The second nose achieves the result that the second lateral air gap section between the second leg and the armature is also further increased in size. This specific embodiment is advantageous in particular when the second leg is the leg of the stator nearest a support of the armature, because smaller air gap fluctuations occur in the air gap section closer to the support of the armature, and the air gap is designed to have a smaller gap width on the whole.

To further improve the mechanical performance, it is advantageous if the armature has a recess having an essentially triangular shape in the area of the additional leg and if the recess has at least one section which points toward the stator and runs parallel to the longitudinal axis of the additional leg. The additional leg is designed to be of a suitable length so that in at least one section running parallel to its longitudinal axis, it engages in the recess formed in the armature. Such a design of the armature and the additional leg ensures that even during operation of the drive unit, the armature and additional leg permanently cover each other, and thus the magnetic flux in this area is optimized.

The armature is advantageously connected to the stator or supported therewith in a vibration-capable mount via a spring bracket, which may be placed on the second end of the armature. Alternatively, a vibration-capable support of the armature may also be provided by a fastening to an armature angle in a housing known from the prior art. However, the vibration-capable configuration of the armature on the stator via the spring bracket has the advantage that the drive unit may be premounted outside of the housing and then mounted as a module in the housing. The spring bracket may be attached to the armature and/or the stator by pressing it into a suitably shaped slot.

To optimize the magnetic flux, it is helpful if the stator has inside radii at transitions to the legs suitable for counteracting an excessive increase in the magnetic flux density in this area. Inside radii in this connection are understood to be rounded transitions which prevent a local increase in the magnetic flux density.

To further optimize the consumption of material, it is advisable for the at least one additional leg to be designed thinner than the first and second legs. This measure makes it possible to achieve the same number of coil windings with reduced consumption of copper wire or to implement an increased number of windings of the exciter coil with the same consumption of copper wire.

The exciter coil and the additional leg are ideally designed so that the additional leg is operated approximately in magnetic saturation at a given magnetic field strength. In this context, it is not advisable to exceed the saturation range because when operating in the saturation range, increased field strength is achievable only by an extremely elevated consumption of the product of current×windings.

For geometric optimization of the stamped blank, it is advisable in this context if the stator has a recess between the first leg and the at least one additional leg, so that an additional leg of a further stator plate engages in this recess in a stamped configuration. Through such a configuration, it is possible to design the additional leg to be longer and nevertheless allow the most compact possible configuration for the stamped blank.

In a refinement of the system described herein, two additional parallel legs are provided with the stator. This specific embodiment has the advantage that the width of the additional legs may be further reduced and the placement of two exciter coils is possible.

A configuration of stamped profiles for a stator as described above is characterized in that two stator plates are rotated by 180°, the configuration being such that the first nose of the stator plate engages in the notch on the other stator plate. This configuration permits a particularly compact and waste-saving stamping of the individual stator plates.

A drive unit such as that described above is preferably used in a hair cutting machine in particular.

BRIEF DESCRIPTION OF THE DRAWINGS

Embodiments of the system described herein are explained in greater detail below with reference to the accompanying figures.

DETAILED DESCRIPTION OF VARIOUS EMBODIMENTS

Figure 1:
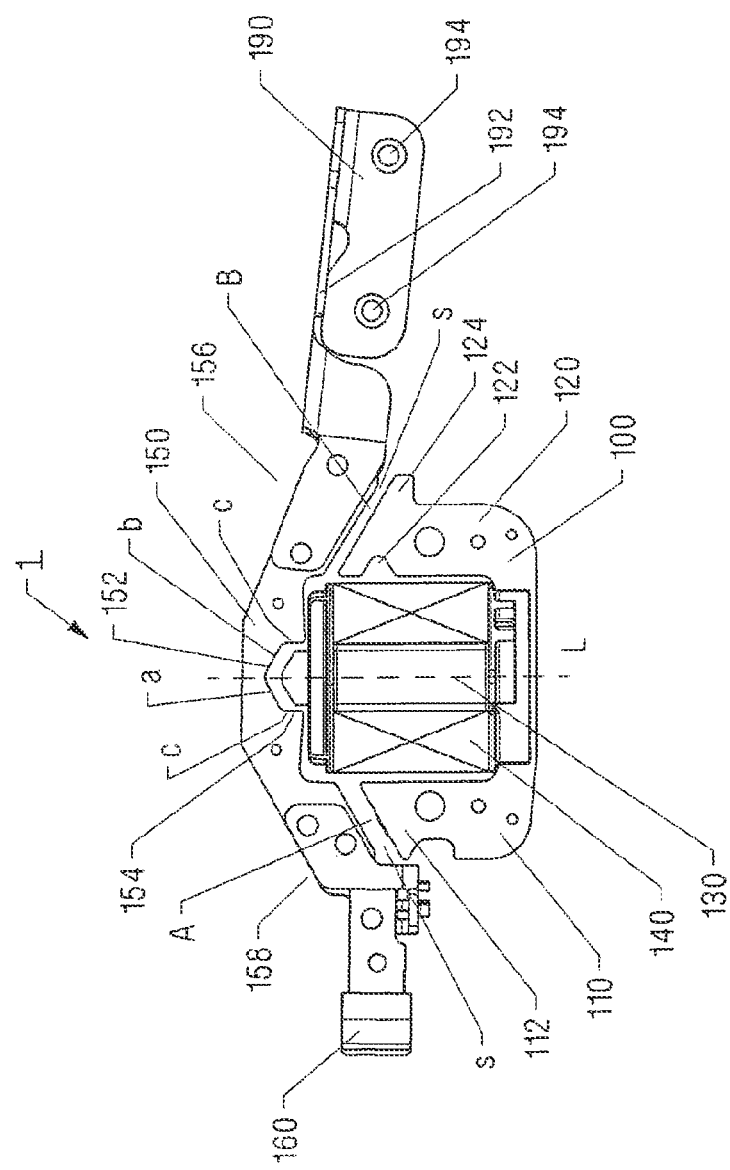
FIG. 1 shows a top view of a first specific embodiment in which the unit including stator and exciter coil is separate from the armature.

Matching parts in the following detailed description of the figures are labeled with the same reference numerals.

FIG. 1 shows a top view of a first exemplary embodiment of a drive unit according to the invention for a hair cutting machine having a drive motor 1. Drive motor 1 is constructed of a stator 100 having an exciter coil 140 and an armature 150 situated in such a way that it corresponds to stator 100. Stator 100 is designed to be essentially U-shaped, having a first leg 110 and a second leg 120. Exciter coil 140 sits on the periphery of an additional leg 130 situated between first leg 110 and second leg 120. Armature 150 is situated across the ends of legs 110, 120, 130 of stator 100, a tappet 160 being attached to first end 158 and a support 190 attached to second end 156. Tappet 160 has a suitable design for inducing vibration of a cutting set of a hair cutting machine and thus transmitting a movement of armature 150 to the cutting set. Support 190 is fastened by bolts 194, for example, in a housing and has an oscillating spring 192, by which armature 150 is mounted to allow vibration.

To achieve desirable mechanical performance of drive motor 1, various measures are implemented for optimization of drive motor 1.

In a first step, the magnetic flow may be guided within drive motor 1 in in an suitable manner to generate the desired magnetically active air gap surfaces or air gap sections. A first air gap section A is formed between first leg 110 of stator 100 and armature 150 and is increased in size toward the outside by the integral molding of a nose 112. A second lateral air gap section B formed between armature 150 and second leg 120 of stator 100 is also enlarged toward the outside by the integral molding of a second nose 124. The increase in size of second air gap section B has a particularly great effect on the mechanical performance of drive motor 1 because second air gap section B is closer to support 190 of armature 150 and therefore the fluctuations in gap width s are smaller.

To allow the most space-saving possible configuration of stamped profiles for stator 100 despite integrally molded first nose 112, a notch 122 is provided on second leg 120. However, the configuration of the stamped profiles is explained in greater detail with reference to FIG. 2.

A second approach to improving the mechanical performance of drive motor 1 is to optimize an air gap between additional leg 130 and armature 150. Armature 150 therefore has a recess 152 in the area of additional leg 130, designed essentially as a triangle having a section 154 running parallel to a longitudinal axis of additional leg 130. Additional leg 130 is also designed to be triangular at the end and engages in recess 152 with its entire width. Thus central air gap sections a and b are formed between additional leg 130 and armature 150, running outward relative to longitudinal axis L and transitioning into air gap section c running parallel to longitudinal axis L. Due to such an embodiment of drive motor 1, deeper engagement of additional leg 130 in recess 152 of armature 150 is achieved, so that a permanent vertical coverage of additional leg 130 and armature 150 is ensured even during operation of drive motor 1. Due to this vertical coverage in air gap sections c running parallel to longitudinal axis L, an improved magnetic flux is achieved, having positive effects on the mechanical performance of drive motor 1.

A third approach to optimizing the efficiency of power motor 1 is to design additional leg 130 with a smaller width d. Due to smaller width d of additional leg 130, it is possible to have a larger number of coil windings on additional leg 130 with otherwise the same consumption of material. This approach also makes it possible to generate the same magnetic field strength H with the same number of windings but a lower consumption of copper wire. The upper limit to be taken into account here is magnetic saturation occurring in a material beyond a certain field strength. In the present case, additional leg 130 of stator 100 is operated approximately in magnetic saturation.

Figure 2:
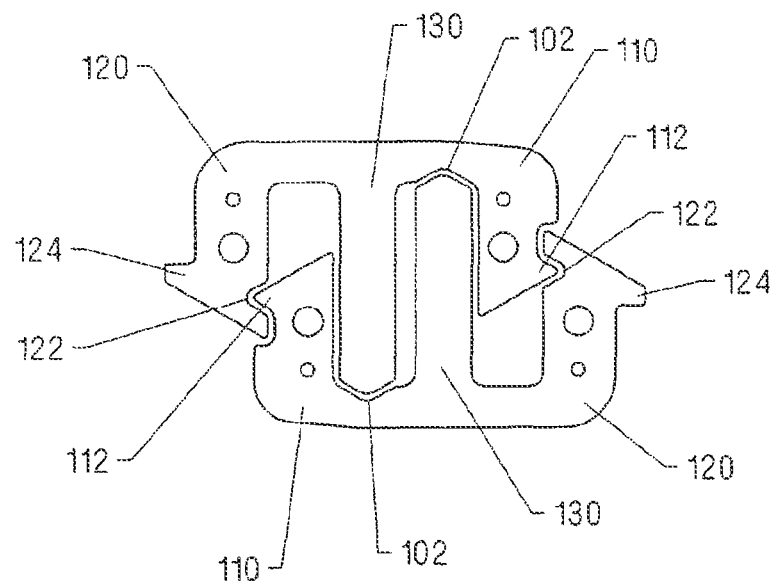
FIG. 2 shows a top view of a configuration of stamped profiles for the stator from FIG. 1.

FIG. 2 shows a top view of a configuration of stamped profiles for stator 100 from FIG. 1. This view shows the corresponding placement of first nose 112 on first leg 110 with notch 122 on second leg 120. First leg 110 is continued in the same width as the integrally molded nose 112 after engagement of second leg 120 via notch 122. This measure is not absolutely necessary but would not cause a reduction in stamping waste and thus may be used as a positive factor in managing the magnetic field. Second noses 124 are provided on the outside in the stamped profile and thus cause a widening thereof, but this is accepted because of the great mechanical effect of a wider second air gap B.

A recess 102 is provided between first leg 110 and additional leg 130. This recess 102 makes it possible to place the stamped profiles one inside the other despite the longer design of additional leg 130 in the form shown here and thus to reduce stamping waste.

Figure 3:
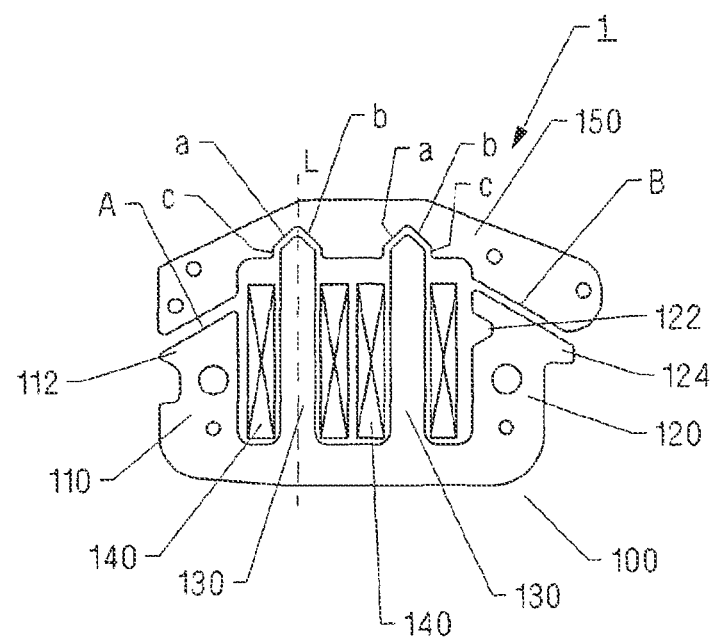
FIG. 3 shows a top view of a second specific embodiment in which the stator is designed to have two additional legs.

FIG. 3 shows a top view of a second specific embodiment of a drive unit for a hair cutting machine. For the sake of simplicity, tappet 160 and support 190 from FIG. 1 are not shown here. The specific embodiment shown in FIG. 3 differs from that shown in FIG. 1 essentially in that two additional legs 130 are provided. Armature 150 also has two recesses 152, both of which are shaped as described in the first exemplary embodiment. An exciter coil 140 is situated on each additional leg 130, exciter coils 140 being triggerable in synchronization for operation of drive motor 1. As shown in FIG. 1, first air gap section A is enlarged by a first nose 112 integrally molded on first leg 110, and second air gap section B is enlarged by a second nose 124 integrally molded on the second leg. Second leg 120 also has a notch 122 provided to correspond to first nose 112 in this specific embodiment. Due to the design of stator 100 having two additional legs 130 and two exciter coils 140 situated thereon, it is possible first of all to generate a greater magnetic flux through two exciter coils 140 in stator 100 and at the same time to enlarge the magnetically relevant gap area, which includes lateral air gap sections A, B and central air gap sections a, b as well as sections c running parallel to the longitudinal axis of additional leg 130 and thereby to optimize the mechanical performance of drive motor 1.

Figure 4:
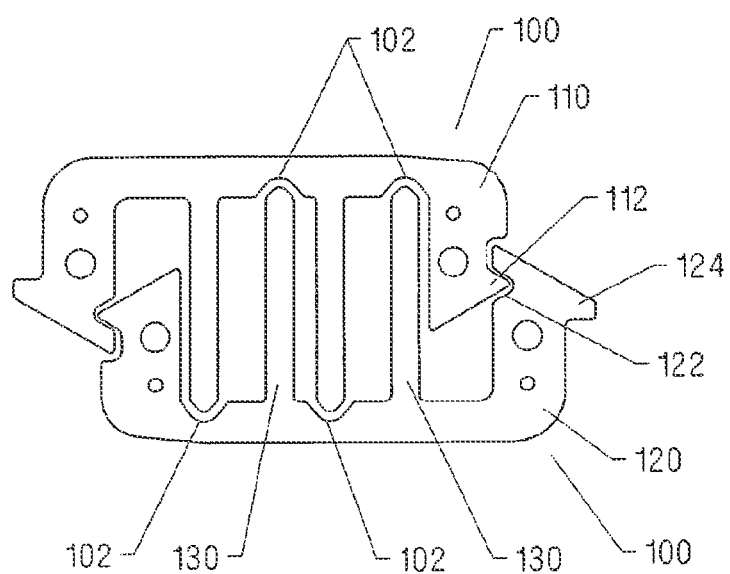
FIG. 4 shows a top view of a configuration of stamped profiles for the stator from FIG. 3.

FIG. 4 shows a top view of a configuration of stamped profiles for a stator 100 as shown in FIG. 3. As in the configuration of stamped profiles in FIG. 2, first nose 112 again engages in notch 122 and thus allows two stamped profiles to lie one inside the other. In the configuration shown in FIG. 4, one of two additional legs 130 comes to lie between first leg 110 and an additional leg 130 of the second stamped profile, second additional leg 130 being situated between two additional legs 130 of the other stamped profile. To be able to design the additional legs 130 to have a greater length, dimpled recesses may be provided between the legs, allowing a compact configuration of the stamped profiles.

It should be recalled in particular that with the specific embodiment shown here, the first leg 110 and second leg 120 of stator 100 may be designed to have a smaller width in order to allow the configuration of the stamped profiles shown in FIG. 4.

Figure 5:
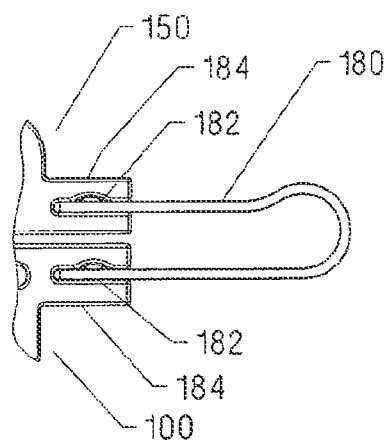
FIG. 5 shows a top view of a detail of the exemplary embodiment from FIG. 1 in which the armature and the stator are connected by a spring bracket.

FIG. 5 shows a detail of the specific embodiment of FIG. 1, in which a spring bracket 180 connecting armature 150 to stator 100 is provided instead of support 190. In this specific embodiment, it is advantageous in particular that drive motor 1 is premountable outside of a housing of the hair cutting machine and is then inserted as a complete module into the housing. Corresponding slots 182 may be provided in armature 150 and stator 100 for fastening spring bracket 180, this spring bracket 180 being pressed into the slots. This allows a particularly simple assembly. In the exemplary embodiment shown here, stator 100 and armature 150 have a rectangular molding 184 in which slots 182 are provided. However, molding 184 may also be shaped in such a way that a slot running at an inclination is achieved.

In summary, it should be pointed out that several advantages are achievable through the specific embodiments presented here. In particular, optimization of the mechanical performance of the drive motor is possible due to the novel design of the lateral air gap sections A, B as well as central air gap sections a, b and supplementation thereof by parallel air gap sections c. In addition, it is possible to achieve a compact configuration of the stamped profiles and to minimize waste in stamping the individual sheet metal layers in manufacturing drive motor 1 described here due to the corresponding placement of first nose 112 with notch 122. It is also possible to optimize the magnetic flux in the stator and to reduce copper consumption for the windings of exciter coil 140 due to the design of additional leg 130 having a smaller width d.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A drive unit for a hair cutting machine having a drive motor, comprising:
    a substantially U-shaped stator having a first leg and a second leg and at least one additional leg, wherein the at least one additional leg is situated between the first leg and the second leg;
    at least one exciter coil placeable on the at least one additional leg; and
    an armature, wherein lateral gap sections are formed between the first and second legs and the armature, and central air gap sections are formed between the additional leg and the armature, the central air gap sections and the lateral air gap sections each running at an inclination with respect to a longitudinal axis, wherein the armature has a recess in the area of the additional leg, the recess being substantially triangular and having at least one section which faces the armature and runs parallel to the longitudinal axis.

2. The drive unit as recited in claim 1, wherein the additional leg has a length, at least one section of the additional leg running parallel to the longitudinal axis and engaging in a recess situated to correspond to the armature.

3. The drive unit as recited in claim 1, further comprising:
    a tappet situated on a first end of the armature.

4. The drive unit as recited in claim 1, wherein the armature is mounted to allow vibration.

5. The drive unit as recited in claim 1, wherein the stator and the armature are connected by a spring bracket, wherein the spring bracket is placeable on a second end of the armature and on the stator.

6. The drive unit as recited in claim 1, wherein the stator has inside radii at the transitions to the legs that counteract an increase in a magnetic flux density.

7. The drive unit as recited in claim 1, wherein the at least one additional leg is thinner than the first and second legs.

8. The drive unit as recited in claim 1, wherein the at least one additional leg is operated approximately in magnetic saturation at a given magnetic field strength.

9. The drive unit as recited in claim 1, wherein the stator has a recess between the first leg and the at least one additional leg.

10. The drive unit as recited in claim 1, wherein two additional legs aligned in parallel are provided.

11. A hair cutting machine, comprising:
    a drive unit, including:
    a substantially U-shaped stator having a first leg and a second leg and at least one additional leg, wherein the at least one additional leg is situated between the first leg and the second leg;
    at least one exciter coil placeable on the at least one additional leg; and
    an armature, wherein lateral gap sections are formed between the first and second legs and the armature, and central air gap sections are formed between the additional leg and the armature, the central air gap sections and the lateral air gap sections each running at an inclination with respect to a longitudinal axis, wherein the armature has a recess in the area of the additional leg, the recess being substantially triangular and having at least one section which faces the armature and runs parallel to the longitudinal axis.

12. The hair cutting machine as recited in claim 11, wherein the additional leg has a length, at least one section of the additional leg running parallel to the longitudinal axis and engaging in a recess situated to correspond to the armature.

13. The hair cutting machine as recited in claim 11, further comprising:
    a tappet situated on a first end of the armature.

14. The hair cutting machine as recited in claim 11, wherein the armature is mounted to allow vibration.

* * * * *